United States Patent [19]
Fette et al.

[11] Patent Number: 5,414,614
[45] Date of Patent: May 9, 1995

[54] DYNAMICALLY CONFIGURABLE SWITCHED CAPACITOR POWER SUPPLY AND METHOD

[75] Inventors: Bruce A. Fette, Mesa; Steve D. DaBell, Tempe, both of Ariz.

[73] Assignee: Motorola, Inc., Schaumburg, Ill.

[21] Appl. No.: 254,794

[22] Filed: Jun. 6, 1994

[51] Int. Cl.⁶ .............................................. H02M 3/18
[52] U.S. Cl. ........................................ 363/59; 363/62
[58] Field of Search ................ 363/59, 60, 62, 74, 363/78, 79; 323/282, 283, 285; 307/109, 110, 482

[56] References Cited

U.S. PATENT DOCUMENTS

| | | | |
|---|---|---|---|
| 3,596,369 | 8/1971 | Dickerson et al. | 321/43 |
| 4,398,099 | 8/1983 | Benoit-Gonin et al. | 307/246 |
| 4,841,427 | 6/1989 | Miyazaki et al. | 363/62 |
| 4,952,864 | 8/1990 | Pless et al. | 323/299 |
| 4,992,719 | 2/1991 | Harvey | 363/59 |
| 4,992,922 | 2/1991 | Ishimura et al. | 363/59 |
| 5,095,223 | 3/1992 | Thomas | 307/110 |
| 5,280,420 | 1/1994 | Rapp | 363/60 |

OTHER PUBLICATIONS

"Switched Capacitor Voltage Converter" from Linear Technology, 1990 Linear Datebook.

Primary Examiner—Thomas M. Dougherty
Assistant Examiner—Matthew V. Nguyen
Attorney, Agent, or Firm—Frederick M. Fliegel

[57] ABSTRACT

A dynamically configurable switched capacitor power supply and a method for operation thereof. The power supply includes a first dynamically adjustable switched capacitor network having a first input, a first output and including a first plurality of n many switched capacitors. The first input is adapted to be coupled to a power source. The first dynamically adjustable switched capacitor network provides a step-up or step-down power supply regulation function in response to first control signals. The power supply includes a control network having an error detector coupled to the first output, an oscillator for providing a clocking signal, an analog to digital conversion circuit for providing a digital representation of a voltage of the power source and control logic for providing the first control signals in response to the clocking signal and in response to signals from the error detector.

19 Claims, 1 Drawing Sheet

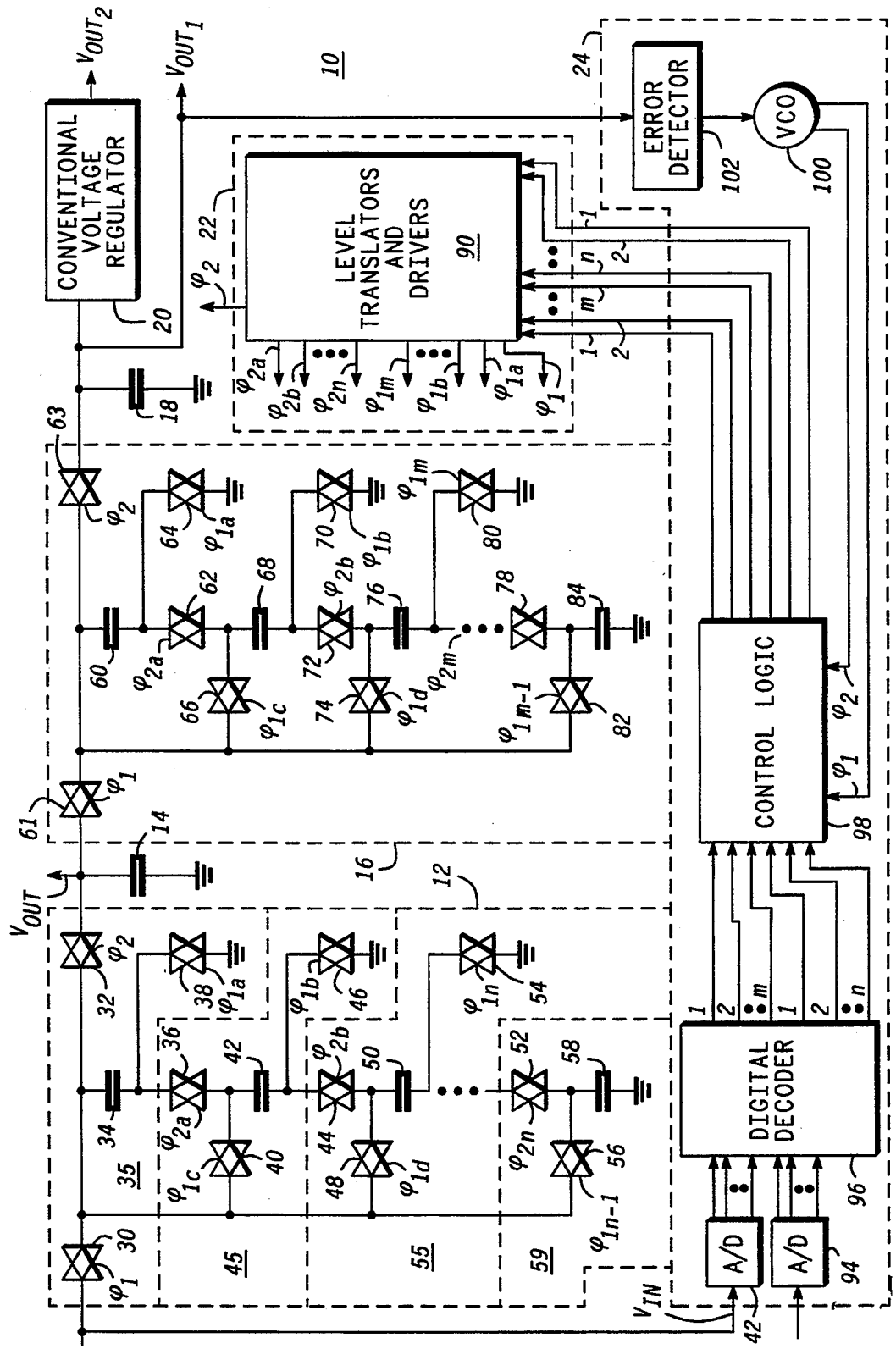

DYNAMICALLY CONFIGURABLE SWITCHED CAPACITOR POWER SUPPLY AND METHOD

FIELD OF THE INVENTION

This invention relates in general to the field of power supplies, in particular to switched capacitor power supplies and more particularly to a dynamically adjustable switched capacitor power supply and method.

BACKGROUND OF THE INVENTION

Modern electronic apparatus require power supply regulation in small form factor, having high efficiency and including adaptability to various qualities of input power. One approach to providing efficient power supply regulation involves "switched capacitors" configured to provide a step-up (higher output voltage than input voltage) function in addition to regulating output voltage within predetermined limits. Another approach provides a step-down (lower output voltage than input voltage) function. These approaches typically do not allow power supplies to operate in both step-up and step-down modes. In one example, battery-powered equipment includes a switching power supply to allow tighter voltage regulation over the life of a battery charge by providing a step-down function. Battery discharge and equipment operation thus cease when the battery voltage falls to or below the target voltage. This is disadvantageous because useful battery life is shortened and because some types of batteries require deep cycling (total or nearly total discharge prior to recharge) for optimal operation and useful life.

A second disadvantage of many such supplies is that the input-output voltage ratio must be one of a set of discrete values generally related to the number of capacitors being switched (i.e., the discrete values are restricted to integers). In many applications, finer resolution (tighter regulation to a target parameter, e.g., output voltage) than this provides is desirable or necessary.

Thus, what is needed is a practical, economical apparatus and an accompanying method for providing both step-up and step-down power supply regulation and particularly allowing arbitrary choice of input-output voltage ratio together with small form factor and high conversion efficiency.

BRIEF DESCRIPTION OF THE DRAWING

The sole FIGURE is a schematic diagram of a switched capacitor power supply circuit in accordance with the present invention.

DETAILED DESCRIPTION OF THE DRAWING

The terms "open" and "off" are used interchangeably herein to refer to switches that are in a nonconducting state, while the terms "closed" and "on" are both taken to refer to switches that are in a conducting state.

The sole figure is a schematic diagram of switched capacitor power supply circuit 10 in accordance with the present invention. Switched capacitor power supply circuit 10 comprises first and second dynamically adjustable switched capacitor networks 12, 16, optional buffer capacitors 14, 18, optional conventional voltage regulator 20 and control circuit 22 including level translators and drivers 90 and digital control network 24. While switched capacitor power supply circuit 10 is illustrated as comprising two dynamically adjustable switched capacitor networks 12, 16 for ease of illustration and clarity of explanation, it will be appreciated by those of skill in the relevant arts that more or fewer dynamically adjustable switched capacitor networks may be employed in accordance with the requirements of a particular need, such as power and/or footprint requirements or desire for a particular approximation to a specific input/output voltage ratio.

First and second dynamically adjustable switched capacitor networks 12, 16 have outputs desirably coupled to optional first and second buffer capacitors 14, 18, respectively, and first and second dynamically adjustable switched capacitor networks 12, 16 are serially coupled to each other (the output of first dynamically adjustable switched capacitor network 12 is coupled to the input of second dynamically adjustable switched capacitor network 16). Digital control network 24 has an input coupled to the output $V_{OUT1}$ of second dynamically adjustable switched capacitor network 16 and a second input coupled to the input voltage $V_{IN}$. Both first and second dynamically adjustable switched capacitor networks 12, 16 receive clocking signals $\phi\zeta$ (where $\zeta \in \{1_a \ldots 2_n; 1_a \ldots 2_m\}$) from level translators and drivers 90 in response to control signals from digital control logic 24. The clocking signals $\phi\zeta$ directed to each of first and second dynamically adjustable switched capacitor networks 12, 16 are generally different (i.e., $\zeta_{2a}$ for first network 12 is not the same as $\zeta_{2a}$ for second network 16) but are represented similarly herein for ease of understanding and convenience in illustration. Switched capacitor power supply circuit 10 is desirably realized in monolithic form as an MOS or CMOS integrated circuit without requiring inductors or transformers.

Construction of both first and second dynamically adjustable switched capacitor networks 12, 16 is similar and is exemplified by the detailed discussion (infra) based on first dynamically adjustable switched capacitor network 12.

First dynamically adjustable switched capacitor network 12 comprises n many sections, including first section 35, intermediate sections including second section 45 and n-3 sections 55 (partially denoted by ellipsis) analogous to second section 45 and terminal section 59. In first and second dynamically adjustable switched capacitor network 12, 16, n and m are usefully integers generally in the range of 100 or less, desirably in the range of one to twelve and preferably in the range of three to ten (i.e., 3, 4, 5, 6, 7, 8, 9 or 10). A practical consideration on the number of stages (i.e., upper limits for n, m) is that no switch may be required to sustain a voltage greater than the minimum breakdown voltage (e.g., drain to source breakdown voltage when the switches are implemented as field effect transistors) for the switch. Similarly, capacitors such as section capacitors 34, 42 . . . 50, 58 and 60, 68 . . . 76, 84 must not be exposed to voltages greater than their breakdown voltages. As well, level translator and driver 90 must not be exposed to voltages in excess of breakdown voltages of the associated elements thereof.

First dynamically adjustable switched capacitor network 12 may act as a divide-by-n voltage divider, a multiply-by-n voltage multiplier, or may multiply or divide the input voltage $V_{IN}$ by any integer number between 1 and n through provision of appropriate clocking signals $\phi\zeta$ (where $\zeta \in \{1_a \ldots 2_n\}$) by digital control network 24. Digital control network 24 operates in response to (pre)programmed or dynamically variable output voltage criteria, monitoring $V_{IN}$ via analog to digital converter (A/D) 42 and output voltage errors as monitored through $V_{OUT}$, error detector 102 and voltage controlled oscillator (VCO) 100.

First or initial section 35 of first dynamically adjustable switched capacitor network 12 includes input switch 30 having a first terminal coupled to an external power source (not illustrated, $V_{IN}$) and a second terminal coupled to a first lead of first section capacitor 34. Output switch 32 has a first terminal coupled to the second terminal of input switch 30. First section capacitor 34 has a second lead coupled to a first terminal of switch 38, a second terminal of which is grounded. When input switch 30 is "on" (i.e., couples first capacitor 34 to the external power source), output switch 32 is "off" (i.e., open-circuited), preventing the external power source from being coupled directly to the output of first dynamically adjustable switched capacitor network 12 Similarly, when output switch 32 is "on" input switch 30 is "off". Generally, a "dead zone" (i.e., both input switch 30 and output switch 32 "off") is employed between times when either input switch 30 or output switch 32 is "on" in order to ensure that input switch 30 and output switch 32 are not "on" simultaneously (e.g., due to differences in clock signal and/or switching delays) and to allow any transient signal artifacts from the switching process to settle. This "dead zone" typically totals about 10% of the duty cycle but may be chosen anywhere in the range of from 1% to 10% of the duty cycle.

Second section 45 includes top switch 36 having a first terminal coupled to the second terminal of input section capacitor 34 and having a second terminal coupled to a first lead of second section capacitor 42. Second section input switch 40 has a first terminal coupled to the second terminal of input switch 30 and has a second terminal coupled to the first lead of second section capacitor 42. A second lead of second section capacitor 42 is coupled to a first terminal of second section ground switch 46, a second terminal of which is coupled to ground. Top switch 44 of n-3 sections 55 is also coupled to the second terminal of second section 45, "daisy chaining" second intermediate section 45 to next intermediate section 55.

This "daisy chaining" is repeated for subsequent intermediate sections until terminal section 59 is reached, i.e., n-3 many further intermediate sections (partially represented by ellipsis within section 55) each are analogous to second intermediate section 45, each comprising a top switch (e.g., top switch 44) coupled to a second lead of a section capacitor within an intermediate section immediately above (e.g., analogous to second section capacitor 42), a section input switch (e.g., section input switch 48) having a first terminal coupled to the second terminal of input switch 30 and a second terminal coupled to the first lead of a section capacitor (e.g., section capacitor 50), which, in turn, has a lead terminal coupled to a succeeding section (i.e., daisy chaining sections together) and a ground switch (e.g., ground switch 54) having a first terminal coupled to the second terminal of the section capacitor and having a second terminal coupled to ground.

Terminal section 59 comprises terminal input switch 56 having a first terminal coupled to the second terminal of input switch 30, terminal section capacitor 58 having a first lead coupled to a second terminal of terminal input switch 56 and having a second lead coupled to ground and terminal top switch 52 having a first terminal coupled to a second lead of an intermediate section capacitor immediately above the terminal section and having a second terminal coupled to the first lead of terminal section capacitor 58.

First dynamically adjustable switched capacitor network 12 may be operated in either a step-up or a step-down mode in response to signals from digital control network 24 and may change from, for example, step-down operation to step-up operation as battery voltage decreases when a battery is discharging. This is advantageous both for increasing useful battery life and for completely discharging "deep cycle" batteries (e.g., NiCd batteries) that require full discharge before recharging in order to realize full battery life.

Modes of operation of both first and second dynamically adjustable switched capacitor networks 12, 16 are similar and are exemplified by the detailed discussion (infra) based on first dynamically adjustable switched capacitor network 12. Section capacitors 34, 42 . . . 50, 58 are analogous to section capacitors 60, 68 . . 76, 84; input switch 30 is analogous to input switch 61; output switch 32 is analogous to output switch 63; top switches 36, 44 . . . 52 are analogous to top switches 62, 72 . . . 78; ground switches 38, 46 . . . 54 are analogous to ground switches 64, 70 . . . 80; and section input switches 40 . . . 48, 56 are analogous to section input switches 66 . . . 74, 82 of first and second dynamically adjustable switched capacitor networks 12, 16, respectively, except that different numbers of sections may comprise each of first and second dynamically adjustable switched capacitor networks 12, 16.

I. STEP-UP OPERATION

In step-up operation, section capacitors 34, 42, 50, 58 are typically charged in parallel by (i) opening input switch 30 and output switch 32, (ii) closing ground switches 38, 46 . . . 54, (iii) closing section input switches 40, 48, 56, (iv) opening top switches 36, 44 . . . 52 and then (v) closing input switch 30 to charge each of section capacitors 34, 42 . . . 50, 58 individually to a voltage approaching $V_{IN}$. Following the charging cycle, (vi) input switch 30 is opened (output switch 32 remains open), (vii) section input switches 40 . . . 48, 56 are opened, (viii) ground switches 38, 46 . . . 54 are opened, (ix) top switches 36, 44 . . . 52 are closed and (x) output switch 32 is closed to connect section capacitors 34, 42 . . . 50, 58 in series and to connect the series combination of section capacitors 34, 42 . . . 50, 58 to the load. Optional buffer capacitor 14 reduces any switching noise that may be present in the output voltage of first dynamically adjustable switched capacitor network 12.

II. STEP-DOWN OPERATION

In step-down operation, section capacitors 34, 42, 50, 58 are typically charged in series by (i) opening output switch 32 and section input switches 40, 48 . . . 56, (ii) opening ground switches 38, 46 . . . 54, (iii) closing top switches 36, 44 . . . 52 and then (iv) closing input switch 30 to charge the series combination of section capacitors 34, 42 . . . 50, 58 to a voltage approaching $V_{IN}$. Following the charging cycle, (v) input switch 30 is opened, (vi) top switches 36, 44 . . . 52 are opened, (vii) ground switches 38, 46 . . . 54 are closed, (viii) section input switches 40, 48 . . . 56 are closed and (ix) output switch 32 is closed to connect section capacitors 34, 42 . . . 50, 58 in parallel and to connect the parallel combination of section capacitors 34, 42 . . . 50, 58 to the load.

III. DYNAMIC ADJUSTMENT OF THE DIVISION OR MULTIPLICATION RATIO

First dynamically adjustable switched capacitor network 12 may be operated either as a voltage multiplier that multiplies $V_{IN}$, or as a voltage divider that divides $V_{IN}$, by any integer between 1 and n by effectively deleting sections from first dynamically adjustable switched capacitor network 12 "on the fly" (i.e., under the control of digital control network 24) by inactivating sections beginning with terminal section 59 and proceeding sequentially up the chain of sections from terminal section 59 towards initial section 35. Sections (e.g., terminal section 59) are inactivated by (i) setting the ground switch immediately above the section to be inactivated "on" (e.g., ground switch 54), (ii) setting the section input switch "off" (e.g., section input switch 56) and optionally setting the section top switch (e.g., top switch 52) "off" to reduce switching power consumption. Sections may be inactivated or activated by digital control network 24 as required to maintain a desired output voltage $V_{OUT}$ in response to changes in the input voltage $V_{IN}$.

Second dynamically adjustable switched capacitor network 16 is directly analogous to first dynamically adjustable switched capacitor network 12, except that second dynamically adjustable switched capacitor network 16 comprises m many sections, wherein m may differ from n or not as desired. Second dynamically adjustable switched capacitor network 12 may act as a divide-by-m voltage divider, a multiply-by-m voltage multiplier, or may multiply or divide the input voltage $V_{IN}$ by any integer number between 1 and m through provision of appropriate clocking signals $\phi \zeta$ (where $\zeta \epsilon \{1_a \ldots 2_m\}$) by digital control network 24.

Input switch 61 of second dynamically adjustable switched capacitor network 16 has a first terminal coupled to the second terminal of output switch 32 of first dynamically adjustable switched capacitor network 12. Output switch 63 has a first terminal coupled to a second terminal of input switch 61 and has a second terminal (providing output voltage $V_{OUT1}$) desirably coupled to optional second buffer capacitor 18. If desired, output voltage $V_{OUT1}$ may be further regulated with conventional voltage regulator 20 to provide $V_{OUT2}$.

An advantage that may be realized from the interconnection of first and second dynamically adjustable switched capacitor networks 12, 16 is that first dynamically adjustable switched capacitor network 12 may be operated in step-up mode while second dynamically adjustable switched capacitor network 16 is operated in step-down mode (or vice-versa) to provide n/m voltage multiplication or division, allowing finer resolution in matching between input voltage $V_{IN}$ and output voltage $V_{OUT1}$. Further, x/y voltage multiplication or division may be realized, where $x \epsilon \{1 \ldots n\}$ and $y \epsilon \{1 \ldots m\}$. Finer desired output voltage resolution is possible throughout the range of input voltages encountered, improving the achieved degree of output voltage regulation provided by switched capacitor power supply circuit 10.

Digital control network 24 is usefully configured as illustrated, with error detector 102 coupled to VCO 100. When output voltage $V_{OUT1}$ decreases below a predetermined value, VCO 100 increases the frequency of clock signals $\phi_1$ and $\phi_2$, increasing the current supplied by switched capacitor power supply circuit 10. Similarly, when output voltage $V_{OUT1}$ increases above a predetermined value, VCO 100 decreases the frequency of clock signals $\phi_1$ and $\phi_2$, decreasing the current supplied by switched capacitor power supply circuit 10.

VCO 100 may compensate for changing load or source conditions by adjustment of the oscillation frequency. For example, it is advantageous to lower the oscillation frequency when the load is light because this reduces losses associated with the switching processes. Minimum frequencies of operation for VCO 100 may be determined from practical considerations such as the maximum allowed voltage ripple at the output. Also, adjustment of the frequency of VCO 100 may allow finer resolution of the input/output voltage ratio (i.e., a "tweak") than is possible through adjusting the number of sections of dynamically adjustable switched capacitor networks 12, 16.

The predetermined value may be input to A/D 94 as an analog voltage. In this scenario, digital decoder 96 determines which of first and second dynamically adjustable switched capacitor networks 12, 16 operates in step-up or step-down mode and also determines how many sections of each of first and second dynamically adjustable switched capacitor networks 12, 16 are active and inactive by employing predetermined look-up tables, for example. Control logic 98 in turn generates clock phases $1_a \ldots 2_n$ and $1_a \ldots 2_m$, which are level translated and otherwise conditioned by level translators and drivers 90. Clock signals $\phi_{1a}$ through $\phi_{2n}$ and $\phi_{1a}$ through $\phi_{2m}$ are supplied to the appropriate switches in first and second dynamically adjustable switched capacitor networks 12, 16 by level translators and drivers 90.

Alternatively, $V_{OUT1}$ may be converted to a digital value (e.g., by A/D 94) and digital decoder 96/control logic 98 may be supplied with a digital representation of the desired output voltage via a digital input (not illustrated). In this scenario, the clocking signal frequency is either fixed or is adjusted via control signals derived from digital decoder 96/control logic 98. Error detector 102 is not required in this scenario and the function thereof is subsumed by the combination of A/D 94, digital decoder 96 and/or control logic 98.

In some applications, two or more sections (e.g., two of first dynamically adjustable switched capacitor network 12) may be operated in parallel with clocking signals adjusted such that when the first of the two is actually delivering power to the load, the second is charging, and vice versa (i.e., complementary clocking signals). This arrangement has the advantages of providing higher output current than a single section may be able to, reduces EMI and also reduces the amount of ripple present at the output, both because the buffer capacitor (e.g., buffer capacitor 14 or 18) discharges less before beginning another charging cycle and because the buffer capacitor is more effective in reducing the amplitude of ripple when the frequency of the ripple is higher (the two sections operating in parallel with clocking signals synchronized as described above provide twice the ripple frequency that one operating alone would).

The power supply of the instant invention may be advantageously realized as a single integrated circuit, and may be realized as a stand-alone power supply chip or as a portion of a larger integrated circuit such as a very large scale integrated circuit (i.e., VLSI or ULSI circuit).

The foregoing description of the specific embodiments will so fully reveal the general nature of the invention that others can, by applying current knowledge, readily modify and/or adapt for various applications such specific embodiments without departing from the generic concept, and therefore such adaptations and modifications should and are intended to be comprehended within the meaning and range of equivalents of the disclosed embodiments.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A dynamically configurable switched capacitor power supply comprising:
    a first dynamically adjustable switched capacitor network having a first input, a first output and including a first plurality of n many switched capacitors, said first input adapted to be coupled to a power source, said first dynamically adjustable switched capacitor network for providing a step-up or step-down power supply regulation function in response to first control signals; and
    a control network comprising:
        an error detector coupled to said first output;
        an oscillator for providing a clocking signal;
        an analog to digital conversion circuit for providing a digital representation of a voltage of said power source; and
        control logic for providing said first control signals in response to said clocking signal and in response to signals from said error detector.

2. A power supply as claimed in claim 1, wherein said first dynamically adjustable switched capacitor network includes n many sections, including:
    a first initial section having a first initial input interconnection, a first initial output interconnection and a first initial bottom interconnection, said first initial input interconnection coupled to said first input, said first initial section comprising:
        a first input switch including a first terminal coupled to said initial input interconnection;
        a first initial section capacitor including a first lead coupled to a second terminal of said first input switch and a second lead coupled to said first initial bottom interconnection;
        a first output switch including a first terminal coupled to said second terminal of said first input switch and a second terminal coupled to said first initial output interconnection; and
        a first ground switch including a first terminal coupled to said second lead of said first initial section capacitor and a second terminal coupled to ground.

3. A power supply as claimed in claim 2, wherein said n many sections further include:
    a first intermediate section including a first intermediate input interconnection coupled to said second terminal of said first input switch, a first intermediate output interconnection, a first intermediate top interconnection coupled to said first initial bottom interconnection and a first intermediate bottom interconnection, said first intermediate section comprising:
        a first intermediate top switch having a first terminal coupled to said first initial bottom interconnection;
        a first intermediate section capacitor having a first lead coupled to a second terminal of said first intermediate top switch and having a second lead coupled to said first intermediate bottom interconnection;
        a first intermediate input switch having a first terminal coupled to said second terminal of said first input switch and having a second terminal coupled to said first lead of said first intermediate section capacitor; and
        a first intermediate ground switch having a first terminal coupled to said second lead of said first intermediate section capacitor and having a second terminal coupled to ground.

4. A power supply as claimed in claim 3, wherein said n many sections further include:
    a first terminal section including a first terminal top interconnection and a first terminal input interconnection, wherein said first terminal input interconnection is coupled to said second terminal of said first input switch and said first intermediate bottom interconnection is coupled to said first terminal top interconnection, said first terminal section comprising:
        a terminal section capacitor having a first lead and having a second lead coupled to ground;
        a terminal top switch having a first terminal coupled to said terminal top interconnection and having a second terminal coupled to said second lead of said terminal section capacitor; and
        a terminal input switch having a first terminal coupled to said terminal input interconnection and having a second terminal coupled to said second lead of said terminal section capacitor.

5. A power supply as claimed in claim 1, further comprising:
    a second dynamically adjustable switched capacitor network having a second input, a second output and including a second plurality of m many switched capacitors, said second input coupled to said first output, said second dynamically adjustable switched capacitor network for providing a step-up or step-down power supply regulation function in response to second control signals; and
    wherein said control network comprises control logic for providing said second control signals.

6. A power supply as claimed in claim 5, wherein said second dynamically adjustable switched capacitor network includes m many sections, including:
    a second initial section having a second initial input interconnection, a second initial output interconnection and a second initial bottom interconnection, said second initial input interconnection coupled to said second input;
    a second intermediate section including a second intermediate input interconnection coupled to said second input, a second intermediate output interconnection, a second intermediate top interconnection coupled to said second initial bottom interconnection and a second intermediate bottom interconnection; and
    a second terminal section including a second terminal top interconnection and a second terminal input interconnection, wherein said second intermediate bottom interconnection is coupled to said second terminal top interconnection.

7. A power supply as claimed in claim 6, wherein said second initial section comprises:
    a second input switch including a first terminal coupled to said second initial input interconnection, wherein said second terminal input interconnection is coupled to a second terminal of said second input switch;

a second initial section capacitor including a first lead coupled to a second terminal of said second input switch and a second lead coupled to said second initial bottom interconnection;

a second output switch including a first terminal coupled to said second terminal of said second input switch and a second terminal coupled to said second initial output interconnection; and a ground switch including a first terminal coupled to said second lead of said second initial section capacitor and a second terminal coupled to ground.

8. A power supply as claimed in claim 6, wherein said second intermediate section comprises:

a second intermediate top switch having a first terminal coupled to said second initial bottom interconnection;

a second intermediate section capacitor having a first lead coupled to a second terminal of said second intermediate top switch and having a second lead coupled to said second intermediate bottom interconnection;

a second intermediate input switch having a first terminal coupled to said second terminal of said second input switch and having a second terminal coupled to said first lead of said second intermediate section capacitor; and a second intermediate ground switch having a first terminal coupled to said second lead of said second intermediate section capacitor and having a second terminal coupled to ground.

9. A power supply as claimed in claim 6, wherein said second terminal section comprises:

a second terminal section capacitor having a first lead and having a second lead coupled to ground;

a second terminal top switch having a first terminal coupled to said second terminal top interconnection and having a second terminal coupled to said second lead of said second terminal section capacitor; and a second terminal input switch having a first terminal coupled to said second terminal input interconnection and having a second terminal coupled to said second lead of said second terminal section capacitor.

10. A power supply as claimed in claim 1, wherein said oscillator comprises a voltage controlled oscillator coupled to said error detector, said voltage controlled oscillator providing first control signals having an increased clocking frequency when said error detector detects that an output voltage decreases below a first predetermined limit and for providing first control signals having a reduced clocking frequency when said error detector detects that an output voltage increases above a second predetermined limit.

11. In a dynamically configurable switched capacitor power supply comprising a first dynamically adjustable switched capacitor network having a first input, a first output and including a first plurality of n many switched capacitors, said first input adapted to be coupled to a power source, said first dynamically adjustable switched capacitor network responsive to first control signals, and a control network comprising an error detector coupled to said first output, an oscillator for providing a clocking signal, an analog to digital conversion circuit for providing a digital representation of a voltage of said power source, and control logic for providing said first control signals in response to said clocking signal and in response to signals from said error detector, a method for providing step-up or step-down regulation, said method comprising steps of:

comparing an output voltage to a predetermined desired value;

increasing a frequency of said oscillator when said output voltage is less than said predetermined desired value by a first predetermined amount; and decreasing a frequency of said oscillator when said output voltage is greater than said predetermined desired value by a second predetermined amount.

12. A method as claimed in claim 11, further comprising steps of:

comparing an input voltage to a desired output voltage to determine a ratio of input voltage to desired output voltage;

determining when said input voltage is greater than an output voltage;

setting said first dynamically adjustable switched capacitor network to perform a step-down function when said input voltage is greater than said output voltage; and setting said first dynamically adjustable switched capacitor network to perform a step-up function when said input voltage is less than said desired output voltage.

13. A method as claimed in claim 11, wherein said first dynamically adjustable switched capacitor network comprises an initial section having an initial input interconnection, an initial output interconnection and an initial bottom interconnection, said initial input interconnection coupled to said input an intermediate section including an intermediate input interconnection coupled to a second terminal of said input switch, an intermediate output interconnection, an intermediate top interconnection coupled to said initial bottom interconnection and an intermediate bottom interconnection, and a terminal section including a terminal top interconnection and a terminal input interconnection, wherein said terminal input interconnection is coupled to said second terminal of said input switch and said intermediate bottom interconnection is coupled to said terminal top interconnection, further comprising steps of:

comparing an input voltage to a desired output voltage to determine a ratio of input voltage to desired output voltage;

determining a number between one and n approximating said ratio; and turning off said terminal section when said number is less than n.

14. A method as claimed in claim 13, further comprising a step of turning off said intermediate section when said number is less than n minus one.

15. A method as claimed in claim 13, wherein said terminal section comprises a terminal section capacitor having a first lead and having a second lead coupled to ground a terminal top switch having a first terminal coupled to said terminal top interconnection and having a second terminal coupled to said second lead of said terminal section capacitor, and a terminal input switch having a first terminal coupled to said terminal input interconnection and having a second terminal coupled to said second lead of said terminal section capacitor, and wherein said intermediate section comprises an intermediate top switch having a first terminal coupled to said initial bottom interconnection, an intermediate section capacitor having a first lead coupled to a second terminal of said intermediate top switch and having a second lead coupled to said intermediate bottom interconnection, an intermediate input switch having a first terminal coupled to said second terminal of said input switch and having a second terminal coupled to said first lead of said intermediate section capacitor and an intermediate ground switch having a first terminal coupled to said second lead of said intermediate section capacitor and having a second terminal coupled to ground, wherein said step of turning off said terminal section when said number is less than n comprises steps of:

- setting said intermediate ground switch to a conductive state;
- setting said terminal input switch to a nonconductive state; and
- setting said terminal top switch to a nonconductive state.

16. A method as claimed in claim 11, wherein said first dynamically adjustable switched capacitor network and said control network comprise a very large scale integrated circuit.

17. A method as claimed in claim 11, wherein said dynamically configurable switched capacitor power supply further comprises a second dynamically adjustable switched capacitor network having a second input coupled to said first output, a second output and including a second plurality of m many switched capacitors, said second input adapted to be coupled to a power source, said second dynamically adjustable switched capacitor network responsive to second control signals, said method further comprising steps of:

- supplying clocking signals of a first phase to said first dynamically configurable switched capacitor power supply; and
- supplying clocking signals of a second phase to said second dynamically configurable switched capacitor power supply, wherein said clocking signals of said second phase are complementary to said clocking signals of said first phase.

18. A dynamically configurable switched capacitor power supply comprising:

- a first dynamically adjustable switched capacitor network having a first input, a first output and including a first plurality of n many switched capacitors, said first input adapted to be coupled to a power source, said first dynamically adjustable switched capacitor network for providing a step-up or step-down power supply regulation function in response to first control signals comprising first clocking signals;
- a second dynamically adjustable switched capacitor network having a second input coupled to said first output, a second output and including a second plurality of n many switched capacitors, said second input adapted to be coupled to a power source, said second dynamically adjustable switched capacitor network for providing a step-up or step-down power supply regulation function in response to second control signals, wherein said second control signals comprise second clocking signals complementary in phase to said first clocking signals; and
- a control network comprising:
  - an error detector coupled to said second output;
  - an oscillator for providing a clocking signal;
  - an analog to digital conversion circuit for providing a digital representation of a voltage of said power source; and
  - control logic for providing said first and second control signals in response to said clocking signal and in response to signals from said error detector.

19. A power supply as claimed in claim 1, wherein said first dynamically adjustable switched capacitor network and said control network comprise a very large scale integrated circuit.

* * * * *